(12) United States Patent
Numakura et al.

(10) Patent No.: US 9,587,523 B2
(45) Date of Patent: Mar. 7, 2017

(54) OIL CONTROL VALVE

(71) Applicants: Masaki Numakura, Toyota (JP); Yuu Yokoyama, Okazaki (JP)

(72) Inventors: Masaki Numakura, Toyota (JP); Yuu Yokoyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 14/436,259

(22) PCT Filed: Oct. 10, 2013

(86) PCT No.: PCT/JP2013/077638
§ 371 (c)(1),
(2) Date: Apr. 16, 2015

(87) PCT Pub. No.: WO2014/065132
PCT Pub. Date: May 1, 2014

(65) Prior Publication Data
US 2015/0285105 A1 Oct. 8, 2015

(30) Foreign Application Priority Data
Oct. 23, 2012 (JP) .................................. 2012-233687

(51) Int. Cl.
*F01L 1/344* (2006.01)
*F01L 1/34* (2006.01)
*F01L 1/356* (2006.01)

(52) U.S. Cl.
CPC .............. *F01L 1/34* (2013.01); *F01L 1/3442* (2013.01); *F01L 1/356* (2013.01); *F01L 2001/3443* (2013.01); *F01L 2001/34456* (2013.01); *F01L 2001/34463* (2013.01); *Y10T 137/8671* (2015.04)

(58) Field of Classification Search
CPC ................................... F01L 1/34; F01L 1/344
USPC ............................... 123/90.15, 90.17, 90.31
See application file for complete search history.

(56) References Cited

U.S. PATENT DOCUMENTS

| 7,444,964 | B2 | 11/2008 | Kanada et al. |
| 8,166,937 | B2 | 5/2012 | Yamaguchi et al. |
| 2003/0121486 | A1 | 7/2003 | Komazawa et al. |
| 2008/0022953 | A1 | 1/2008 | Kanada et al. |

(Continued)

FOREIGN PATENT DOCUMENTS

| JP | 2006-037886 A | 2/2006 |
| JP | 2010-242535 A | 10/2010 |

(Continued)

*Primary Examiner* — Kevin Murphy
*Assistant Examiner* — Paul J Gray
(74) *Attorney, Agent, or Firm* — Oliff PLC

(57) ABSTRACT

An oil control valve has a housing and a spool valve that is arranged in the housing and is movable in the axial direction. The movement range of the spool valve includes a first area and a second area. In the first area, a port that is connected to a lock mechanism opens to prevent the movement of a variable valve timing mechanism through drainage of oil from the lock mechanism. In the second area, oil is supplied and drained to and from the variable valve timing mechanism through a passage inside the spool valve. The first area exists at a position separated from the second area in the movement range.

3 Claims, 10 Drawing Sheets

(56) References Cited

U.S. PATENT DOCUMENTS

2010/0269772 A1* 10/2010 Takemura ............... F01L 1/022
  123/90.17
2010/0313835 A1   12/2010 Yamaguchi et al.

FOREIGN PATENT DOCUMENTS

JP    2010-285918 A   12/2010
JP    2011-179385 A    9/2011

* cited by examiner

Fig.4 Lock Mode

Fig.7 Maintaining Mode

Fig.8 Phase-Retarding Mode

OIL CONTROL VALVE

FIELD OF THE INVENTION

The present invention relates to an oil control valve.

BACKGROUND OF THE INVENTION

Internal combustion engines mounted in vehicles, such as automobiles, are demanded to be improved in fuel economy and output. To satisfy such demands, internal combustion engines having a variable valve timing mechanism, which varies the valve timing of engine valves such as intake valves and exhaust valves, have been put to practical use.

In such engines, to selectively supply and drain oil to and from the variable valve timing mechanism, a movable member of the mechanism fixed to an end portion of a camshaft is operated to change the rotational phase of the camshaft relative to the crankshaft. This varies the valve timing in the engines. The variable valve timing mechanism includes a lock mechanism for selectively prohibiting and permitting operation of the movable member. To selectively supply and drain oil to and from the lock mechanism, the lock mechanism performs prohibiting operation for prohibiting the operation of the movable member of the variable valve timing mechanism or permitting operation for permitting the operation of the movable member.

Oil is selectively supplied to and drained from the variable valve timing mechanism and the lock mechanism through a plurality of oil lines, which configure hydraulic circuits connecting the respective mechanisms to an oil pump. An oil control valve is arranged in each of the oil lines of the hydraulic circuits to change the supply/drainage modes of oil through the oil line for the variable valve timing mechanism and the lock mechanism. By changing the oil supply/drainage modes for the variable valve timing mechanism and the lock mechanism through the oil control valves, the movable member of the variable valve timing mechanism is operated and the lock mechanism is caused to perform the prohibiting and permitting operations.

The oil control valve includes a cylindrical housing and a spool valve as described in, for example, Patent Document 1. The housing has a plurality of ports connected to the variable valve timing mechanism and the lock mechanism.

The spool valve is arranged in the housing and movable in the axial direction. The position of the spool valve is adjusted in the axial direction to selectively open and close the ports by means of a valve body of the spool valve. This changes the oil supply/drainage modes for the variable valve timing mechanism and the lock mechanism. In the oil control valve described in Patent Document 1, a passage through which oil flows into the spool valve extends in the axial direction of the spool valve. Oil is selectively supplied to and drained from the variable valve timing mechanism via the passage.

PRIOR ART DOCUMENTS

Patent Documents

Patent Document 1: Japanese Laid-Open Patent Publication No. 2010-285918

SUMMARY OF THE INVENTION

In the oil control valve of Patent Document 1, the movement range of the spool valve includes an area (hereinafter, referred to as a first area) for causing the lock mechanism to perform the aforementioned prohibiting operation by draining oil from the lock mechanism and an area (hereinafter, referred to as a second area) for selectively supplying and draining oil to and from the variable valve timing mechanism via the passage formed in the spool valve. A portion of the first area and a portion of the second area are overlapped with each other in the oil control valve.

Specifically, by adjusting the position of the spool valve such that the spool valve is located in the second area, oil is selectively supplied to and drained from the variable valve timing mechanism via the passage formed in the spool valve. This causes the oil flowing in the passage to apply force (hereinafter, referred to as fluid force) to the spool valve in the axial direction of the spool valve. The fluid force is selectively increased and decreased through variation in the flow rate and flow amount of the oil flowing in the aforementioned passage. Such increase and decrease in the fluid force vibrates the spool valve in the axial direction and thus may move the spool valve from the second area to the first area. Such movement of the spool valve to the first area, which is brought about through vibration in the above-described manner, may cause the oil to be drained from the lock mechanism, thus causing the lock mechanism to perform unnecessary prohibiting operation. The prohibiting operation may hamper proper operation of the movable member of the variable valve timing mechanism.

Accordingly, it is an objective of the present invention to provide an oil control valve that restrains a case from occurring in which operation of a lock mechanism is unnecessarily prohibited due to vibration of a spool valve caused by oil flowing in a passage formed in a spool valve, and the prohibition hampers proper operation of a variable valve timing mechanism.

To achieve the foregoing objective and in accordance with one aspect of the present invention, an oil control valve is provided that includes a housing and a spool valve that is arranged in the housing and movable in an axial direction of the spool valve. A plurality of ports connected to a variable valve timing mechanism and a lock mechanism are formed in the housing. The oil control valve is adapted to perform: supply/drainage of oil to and from the variable valve timing mechanism to hydraulically operate the variable valve timing mechanism by adjusting a position of the spool valve in the axial direction to selectively open and close the ports with a valve body of the spool valve; and supply/drainage of oil to and from the lock mechanism to carry out a prohibiting operation for prohibiting operation of the variable valve timing mechanism and a permitting operation for permitting the operation of the variable valve timing mechanism. A passage in which the oil flows is formed in the spool valve. The valve body of the spool valve and the ports of the housing are formed such that: a movement range of the spool valve includes a first area, in which the spool valve opens those of the ports connected to the lock mechanism to perform the prohibiting operation by draining oil from the lock mechanism, and a second area, in which the spool valve performs the supply/drainage of oil to and from the variable valve timing mechanism through the passage; and the first area is located at a position spaced from the second area in the movement range.

DETAILED DESCRIPTION OF THE PREFERRED EMBODIMENTS

An oil control valve for changing a supply-drainage mode of oil for a variable valve timing mechanism according to one embodiment will hereafter be described with reference to FIGS. 1 to 13.

Figure 1:
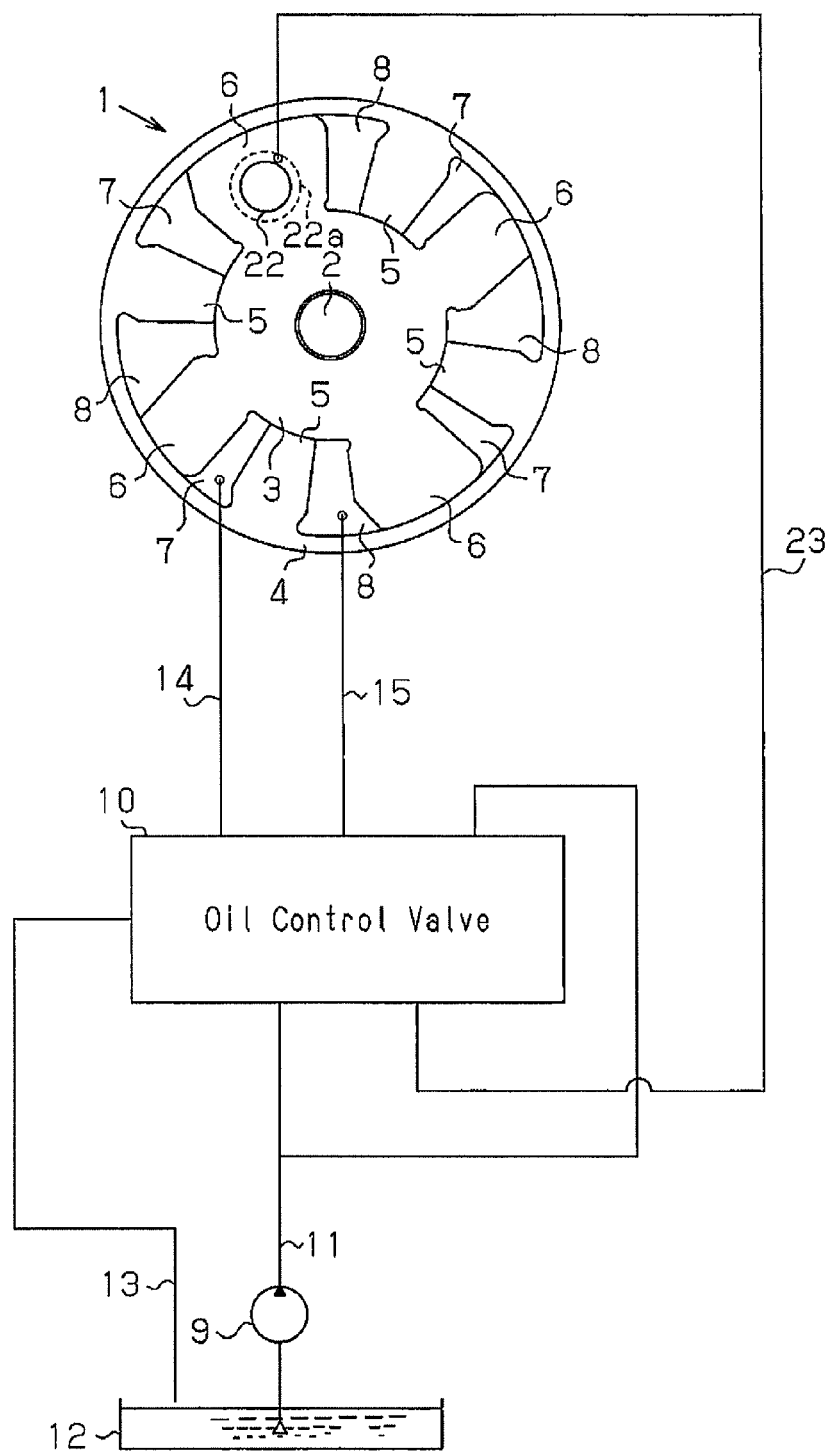
FIG. 1 is a schematic view showing a variable valve timing mechanism and a hydraulic circuit for operating the mechanism.

As shown in FIG. 1, a variable valve timing mechanism 1 has a movable member 3 fixed to a camshaft 2 (for example, an intake camshaft) of an internal combustion engine using a bolt and a case 4 arranged coaxially with the camshaft 2 in a manner surrounding the movable member 3. Rotation of the crankshaft of the engine is transmitted to the case 4. A plurality of projections 5, which project toward the axis of the camshaft 2, are projected from the inner circumferential surface of the case 4 and spaced apart at predetermined intervals in the circumferential direction of the case 4. A plurality of vanes 6, which project away from the axis of the camshaft 2, are extended from the outer circumferential surface of the movable member 3 and each arranged between the corresponding adjacent pair of the projections 5. In this manner, the space between each adjacent pair of the projections 5 in the case 4 is divided into a phase-advancing hydraulic chamber 7 and a phase-retarding hydraulic chamber 8 by the corresponding one of the vanes 6.

By supplying oil to the phase-advancing hydraulic chambers 7 and draining oil from the phase-retarding hydraulic chambers 8, the movable member 3 is rotated relative to the case 4 in the rightward direction as viewed in FIG. 1. This advances the rotational phase of the camshaft 2 relative to the crankshaft, thus advancing the valve timing of engine valves (the intake valves in this example) of the engine. In contrast, by supplying oil to the phase-retarding hydraulic chambers 8 and draining oil from the phase-advancing hydraulic chambers 7, the movable member 3 is rotated relative to the case 4 in the leftward direction as viewed in FIG. 1. This retards the rotational phase of the camshaft 2 relative to the crankshaft, thus retarding the valve timing of the engine valve of the engine.

The variable valve timing mechanism 1 includes a lock mechanism 22, which performs prohibiting operation for prohibiting rotation of the movable member 3 relative to the case 4 and permitting operation for permitting such relative rotation of the movable member 3. In accordance with the permitting operation, the lock mechanism 22 raises the hydraulic pressure in an unlock chamber 22a of the lock mechanism 22 by supplying oil to the unlock chamber 22a. In accordance with the prohibiting operation, the lock mechanism 22 lowers the hydraulic pressure in the unlock chamber 22a by draining the oil from the unlock chamber 22a.

Through the prohibiting operation, the rotational position of the movable member 3 relative to the case 4 is fixed at a middle position in the range of the relative rotation of the movable member 3. In this state, if the aforementioned permitting operation is carried out, the movable member 3 is permitted to rotate relative to the case 4. The valve timing of the engine, which is the rotational phase of the camshaft 2 relative to the crankshaft, at the time of the prohibiting operation by the lock mechanism 22, is set to a relative rotational phase ensuring a state suitable for engine starting or idling. Therefore, at the time of engine starting or idling, the lock mechanism 22 is capable of fixing the valve timing of the engine in the state suitable for the engine starting or idling. Through such fixation, the engine starting or idling is accomplished in a desired state.

Figure 2:
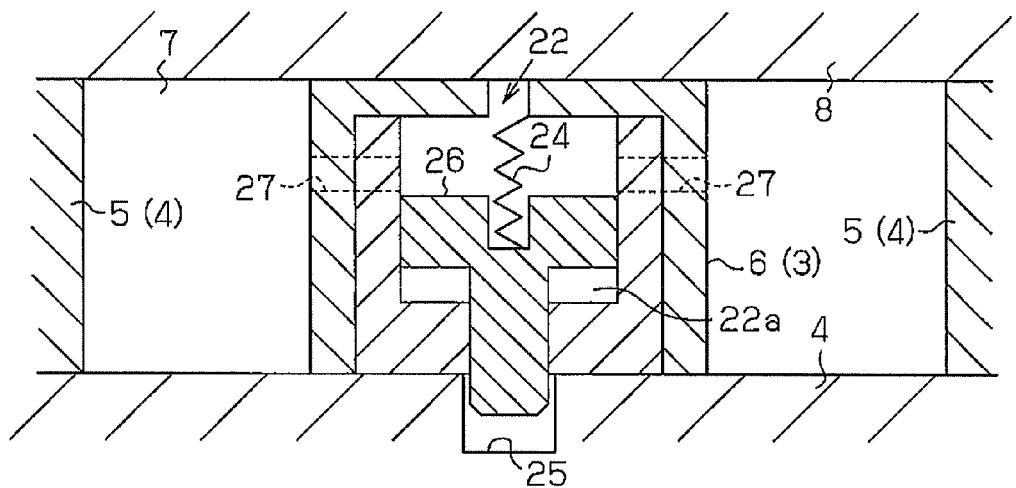
FIG. 2 is a cross-sectional view showing the configuration of a lock mechanism arranged in the variable valve timing mechanism illustrated in FIG. 1.

With reference to FIG. 2, the lock mechanism 22 has a pin 26, which receives force produced by hydraulic pressure in the unlock chamber 22a and urging force of a spring 24 and is thus selectively inserted into and retracted from a hole 25 formed in the case 4. In accordance with the prohibiting operation, the lock mechanism 22 drains oil from the unlock chamber 22a with the pin 26 and the hole 25 aligned with each other. This decreases the force produced by the hydraulic pressure in the unlock chamber 22a, thus causing the pin 26 to be inserted into the hole 25 through the urging force of the spring 24. In accordance with the permitting operation, the lock mechanism 22 supplies oil to the unlock chamber 22a with the pin 26 inserted in the hole 25. This increases the force produced by the hydraulic pressure in the unlock chamber 22a, thus causing the pin 26 to be retracted from the hole 25 against the urging force of the spring 24.

Figure 3:
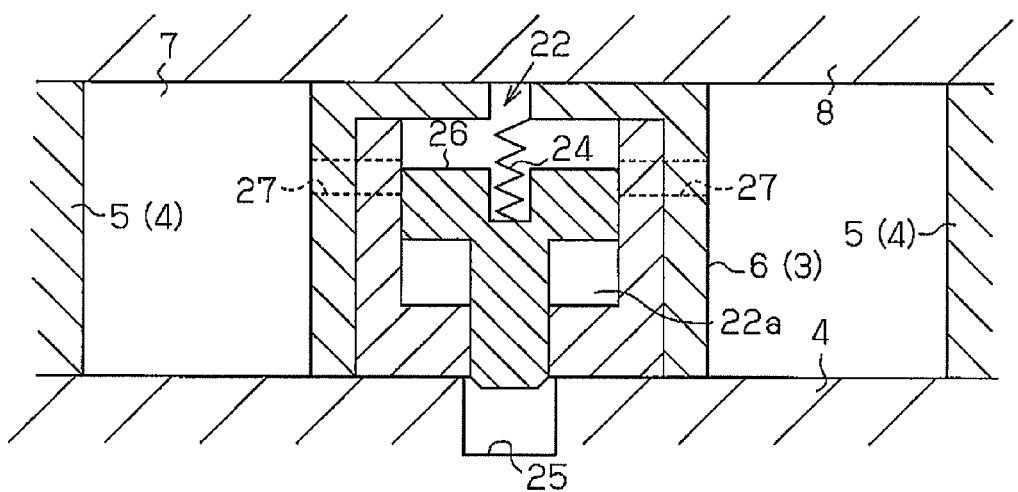
FIG. 3 is another cross-sectional view showing the configuration of the lock mechanism of the variable valve timing mechanism illustrated in FIG. 1.
Figure 4:
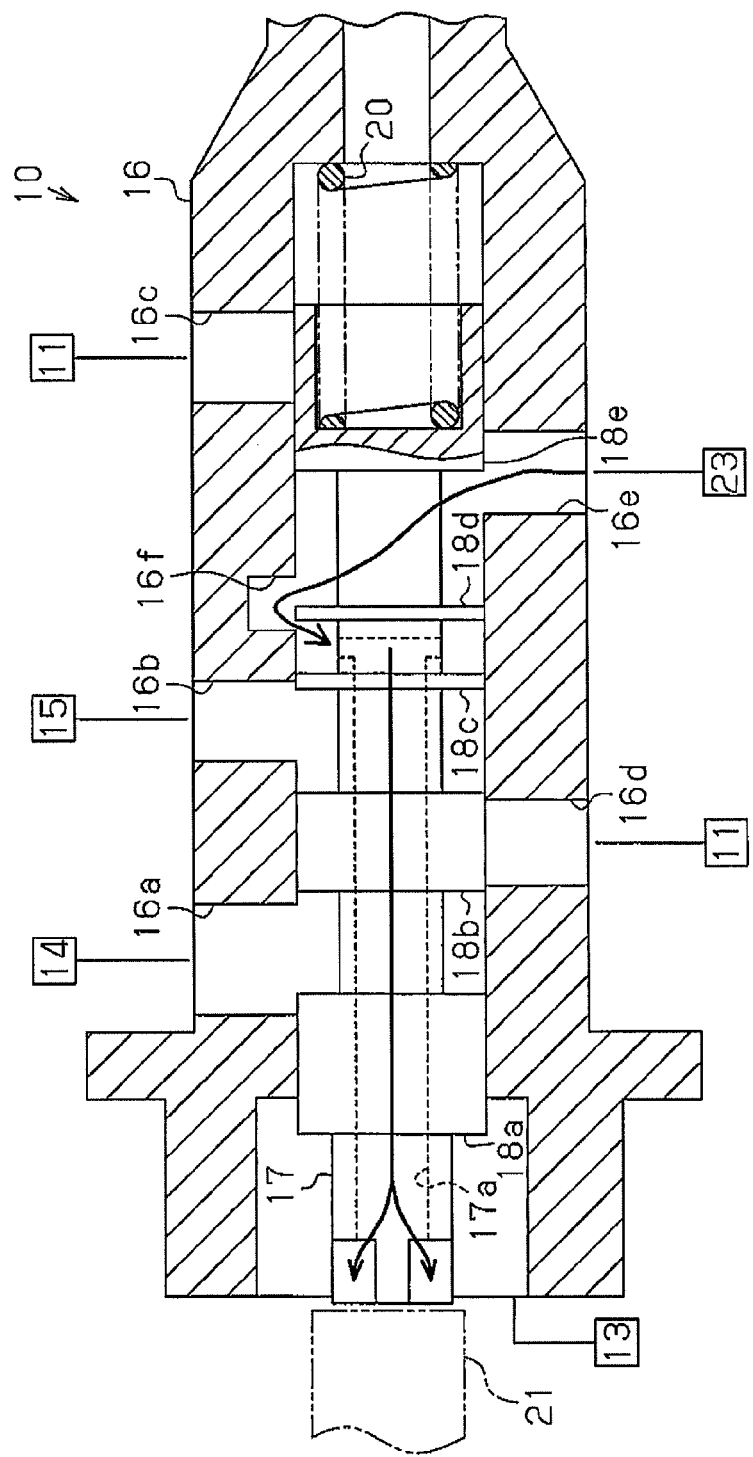
FIG. 4 is a cross-sectional view showing the interior of the oil control valve illustrated in FIG. 1 in a lock mode.
Figure 5:
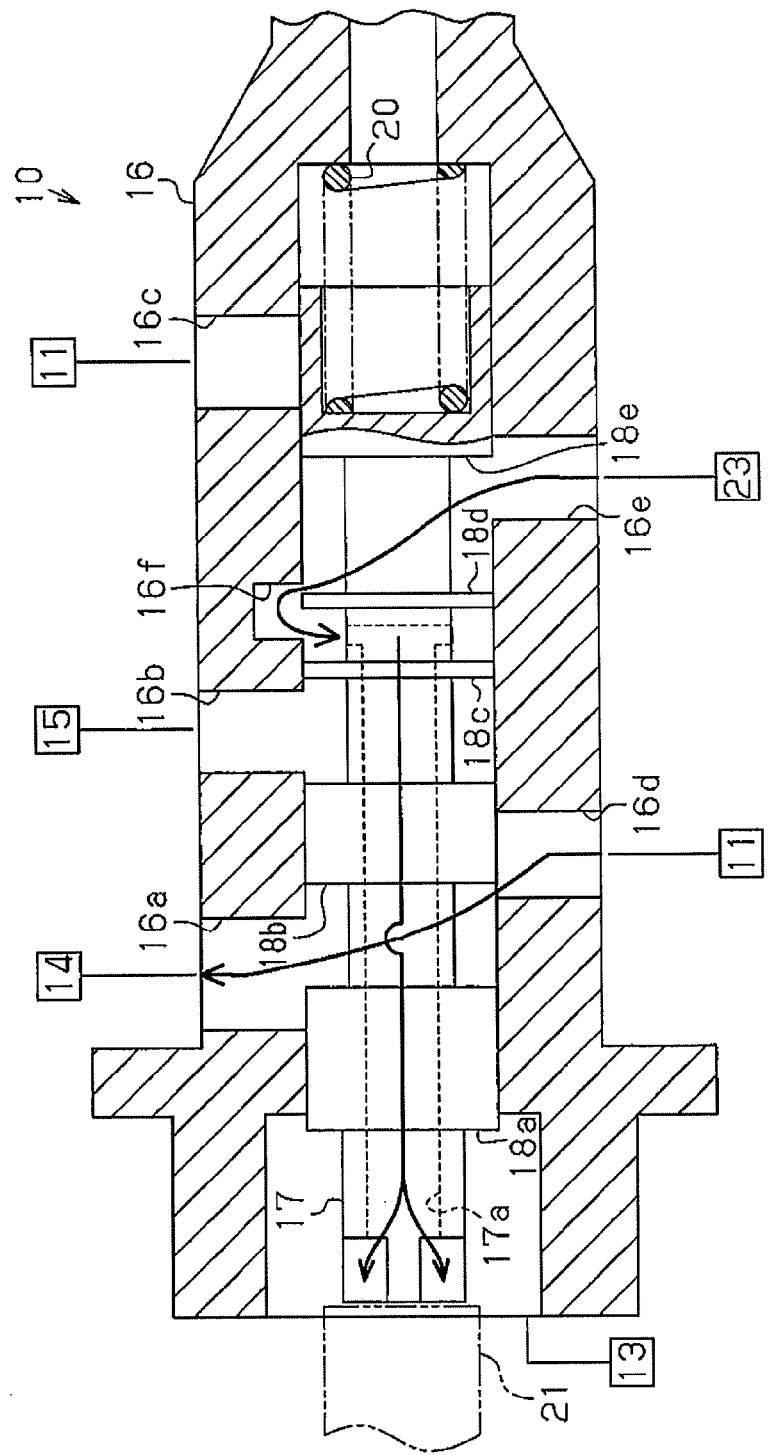
FIG. 5 is a cross-sectional view showing the interior of the oil control valve illustrated in FIG. 1 in an oil filling mode.

A communication line 27 is formed in the movable member 3 to cause the corresponding one of the phase-advancing hydraulic chambers 7 of the variable valve timing mechanism 1 to communicate with the associated one of the phase-retarding hydraulic chambers 8 when the prohibiting operation of the lock mechanism 22 is performed,. The communication line 27 is blocked by the pin 26 when the permitting operation of the lock mechanism 22 is complete. However, in a period immediately after the prohibiting operation is started by the lock mechanism 22 after completion of the permitting operation, the movable member 3 is allowed to operate, that is, the pin 26 moves as illustrated in FIG. 3, for example, to open a portion of the communication line 27. This causes the corresponding phase-advancing hydraulic chamber 7 of the variable valve timing mechanism 1 to communicate with the associated phase-retarding hydraulic chamber 8.

As illustrated in FIG. 1, oil is selectively supplied to and drained from the phase-advancing hydraulic chambers 7 and the phase-retarding hydraulic chambers 8 of the variable valve timing mechanism 1 via a plurality of oil lines forming a hydraulic circuit connecting the variable valve timing mechanism 1 to an oil pump 9. Also, oil is selectively supplied to and drained from the unlock chamber 22a of the lock mechanism 22 via a plurality of oil lines forming a hydraulic circuit connecting the lock mechanism 22 to the oil pump 9. An oil control valve 10 is arranged in the oil lines of these hydraulic circuits to change the oil supply-drainage modes of the oil lines for the variable valve timing mechanism 1 and the lock mechanism 22. By changing the oil supply-drainage modes for the variable valve timing mechanism 1 and the lock mechanism 22 through the oil control valve 10, the movable member 3 of the variable valve timing mechanism 1 is operated. This changes the rotational phase of the camshaft 2 relative to the crankshaft and causes the lock mechanism 22 to perform the prohibiting operation or the permitting operation, as has been described.

The oil control valve 10 is connected to the oil pump 9 via a supply line 11 and to an oil pan 12, which retains oil that has been drawn by the oil pump 9, via a drain line 13. The supply line 11 branches at a position downstream of the oil pump 9 and is thus connected to the oil control valve 10 at corresponding two positions. The oil control valve 10 is connected to each of the phase-advancing hydraulic chambers 7 of the variable valve timing mechanism 1 via a phase-advancing line 14 and to each of the phase-retarding hydraulic chambers 8 of the variable valve timing mechanism 1 via a phase-retarding line 15. Further, the oil control valve 10 is connected to the unlock chamber 22a of the lock mechanism 22, which is arranged in the variable valve timing mechanism 1, via an unlock oil line 23.

In correspondence with the operating state of the engine, the oil control valve 10 operates in any one of a plurality of operating modes. The operating modes of the oil control valve 10 include, for example, a lock mode, an oil filling mode, a phase-advancing mode, a maintaining mode, and a phase-retarding mode, which will be described below.

Lock Mode

The lock mode maintains a state in which the prohibiting operation by the lock mechanism 22 is complete, which is a state in which the pin 26 is inserted in the hole 25. When in the lock mode, the oil control valve 10 operates such that, in the state in which the prohibiting operation by the lock mechanism 22 is complete, the drain line 13 is connected to the unlock oil line 23 and the phase-advancing line 14 and the phase-retarding line 15 are each blocked from the supply line 11 and the drain line 13. This drains the oil from the unlock chamber 22a of the lock mechanism 22 and prohibits the oil supply/drainage to and from each phase-advancing hydraulic chamber 7 and each phase-retarding hydraulic chamber 8 of the variable valve timing mechanism 1. As a result, the state in which the prohibiting operation by the lock mechanism 22 is complete, which is, in other words, a state in which rotation of the movable member 3 relative to the case 4 in the variable valve timing mechanism 1 is prohibited, is maintained.

Oil Filling Mode

The oil filling mode fills the variable valve timing mechanism 1 with oil to cause the variable valve timing mechanism 1 to start hydraulic operation in a state in which the variable valve timing mechanism 1 is without oil, or, for example, the engine is starting, and, at the same time, in the state in which the prohibiting operation by the lock mechanism 22 is complete (the state in which the pin 26 is inserted in the hole 25). When in the oil filling mode, the oil control valve 10 operates such that the supply line 11 is connected to the phase-advancing line 14, the unlock oil line 23 of the lock mechanism 22 is connected to the drain line 13, and the phase-retarding line 15 is blocked from the supply line 11 and the drain line 13. This supplies oil to each phase-advancing hydraulic chamber 7 of the variable valve timing mechanism 1 and drains oil from the unlock chamber 22a of the lock mechanism 22. Also, in the state in which the prohibiting operation by the lock mechanism 22 is complete, the communication line 27 (FIG. 2) causes the corresponding phase-advancing hydraulic chamber 7 and the associated phase-retarding hydraulic chamber 8 to communicate with each other. The oil supplied to the phase-advancing hydraulic chamber 7 thus flows into the phase-retarding hydraulic chamber 8 via the communication line 27, as has been described. In this manner, the phase-advancing hydraulic chamber 7 and the phase-retarding hydraulic chamber 8 of the variable valve timing mechanism 1 are rapidly filled with oil. This quickly switches the movable member 3 of the variable valve timing mechanism 1 to an operable state.

Phase-Advancing Mode

The phase-advancing mode advances the valve timing of the engine by advancing the rotational phase of the camshaft 2 (FIG. 1) relative to the crankshaft. When in the phase-advancing mode, the oil control valve 10 operates such that the supply line 11 is connected to the phase-advancing line 14 and the unlock oil line 23 and the phase-retarding line 15 is connected to the drain line 13. This supplies oil to each phase-advancing hydraulic chamber 7 of the variable valve timing mechanism 1, and the unlock chamber 22a of the lock mechanism 22 and drains oil from each phase-retarding hydraulic chamber 8 of the variable valve timing mechanism 1. As a result, the lock mechanism 22 is switched to a permitting operation state and the movable member 3 of the variable valve timing mechanism 1 is rotated relative to the case 4 in the rightward direction as viewed in the drawing to advance the valve timing of the engine.

Maintaining Mode

The maintaining mode maintains the valve timing of the engine constant by maintaining the rotational phase of the camshaft 2 relative to the crankshaft constant. When in the maintaining mode, the oil control valve 10 operates such that the supply line 11 is connected to the unlock oil line 23 and the phase-advancing line 14 and the phase-retarding line 15 are both blocked from the supply line 11 and the drain line 13. This supplies oil to the unlock chamber 22a of the lock mechanism 22 and prohibits the oil supply/drainage to and from the phase-advancing hydraulic chambers 7 and the phase-retarding hydraulic chambers 8 of the variable valve timing mechanism 1. As a result, while the lock mechanism 22 is maintained in the permitting operation state, rotation of the movable member 3 relative to the case 4 in the variable valve timing mechanism 1 is stopped and the valve timing of the engine is maintained constant.

Phase-Retarding Mode

The phase-retarding mode retards the valve timing of the engine by retarding the rotational phase of the camshaft 2 relative to the crankshaft. When in the phase-retarding mode, the oil control valve 10 operates such that the supply line 11 is connected to the phase-retarding line 15 and the unlock oil line 23, and the phase-advancing line 14 is connected to the drain line 13. This supplies oil to each phase-retarding hydraulic chamber 8 of the variable valve timing mechanism 1 and the unlock chamber 22a of the lock mechanism 22 and drains the oil from each phase-advancing hydraulic chamber 7 of the variable valve timing mechanism 1. As a result, the lock mechanism 22 is switched to the permitting operation state and the movable member 3 of the variable valve timing mechanism 1 is rotated relative to the case 4 in the leftward direction as viewed in the drawing. The valve timing of the engine is thus advanced.

The variable valve timing mechanism 1 are demanded to improve response by which the variable valve timing mechanism 1 is actuated and decrease oil leakage from the portions of the oil lines of the hydraulic circuits (the phase-advancing line 14, the phase-retarding line 15, and the unlock oil line 23) between the variable valve timing mechanism 1 and the oil control valve 10. To satisfy such demands, it is desirable to decrease the length of the portion of each oil line of the respective hydraulic circuits between the oil control valve 10 and the variable valve timing mechanism 1. To decrease the length of the aforementioned portion, the oil control valve 10, for example, may function as a bolt for fixing the movable member 3 of the variable valve timing mechanism 1 to the camshaft 2. In this case, the oil control valve 10 should be arranged in the camshaft 2.

The configuration of the oil control valve 10 will now be described in detail with reference to FIGS. 4 to 8. FIGS. 4 to 8 are cross-sectional views showing the oil control valve 10 in the above-described operating modes, which are the lock mode, the oil filling mode, the phase-advancing mode, the maintaining mode, and the phase-retarding mode.

In the oil control valve 10 illustrated in FIGS. 4 to 8, a spool valve 17 is arranged in a cylindrical housing 16. The spool valve 17 is movable along its axis. The urging force of a spring 20 provided in the housing 16 urges the spool valve 17 toward an end in the axial direction (to the left side as viewed in the drawings, hereinafter referred to as a reference end). An actuator 21, which presses the spool valve 17 against the urging force of the spring 20, and the spring 20 enable the spool valve 17 to move in the axial direction. That is, by adjusting the pressing force applied to the spool valve 17 by the actuator 21, the spool valve 17 is moved in the axial direction such that the pressing force and the urging force of the spring 20 equilibrate with each other. Through such movement of the spool valve 17, the position of the spool valve 17 in the axial direction is adjusted.

A plurality of valve bodies 18a, 18b, 18c, 18d, and 18e are formed in the spool valve 17 sequentially in this order from an end portion of the spool valve 17 close to the actuator 21 and spaced apart at predetermined intervals. A plurality of holes 16a, 16b, 16c, 16d, and 16e are formed in the housing 16, into which the spool valve 17 is inserted, such that the holes 16a to 16e connect the corresponding oil lines of the hydraulic circuits (the supply line 11, the phase-advancing line 14, the phase-retarding line 15, and the unlock oil line 23) to the inner circumferential surface of the housing 16 and each extend linearly in a radial direction of the housing 16. Also, a recess 16f is formed in the inner circumferential surface of the housing 16. The hole 16a is connected to the phase-advancing line 14, and the hole 16b is connected to the phase-retarding line 15. The hole 16c and the hole 16d are connected to the supply line 11, and the hole 16e is connected to the unlock oil line 23. The opening end of the housing 16 at the side close to the actuator 21 (the left side as viewed in the drawing) is connected to the drain line 13, out of the multiple oil lines of the hydraulic circuits, and communicates with a drainage passage 17a formed in the spool valve 17. An opening of the drainage passage 17a is formed at the end portion of the spool valve 17 at the side close to the actuator 21 (the left side as viewed in the drawing). The drainage passage 17a extends in the axial direction of the spool valve 17 with other openings of the drainage passage 17a formed in an axial middle portion of the spool valve 17, which is, more specifically, the outer circumferential surface of the portion of the spool valve 17 between the valve body 18c and the valve body 18d.

The holes 16a, 16b, 16e and the recess 16f of the housing 16 each function as a port connected to the variable valve timing mechanism 1 and the lock mechanism 22. More specifically, the hole 16a functions as a port connected to the phase-advancing hydraulic chamber 7. The hole 16b and the recess 16f each function as a port connected to the phase-retarding hydraulic chamber 8. The hole 16e and the recess 16f each function as a port connected to the unlock chamber 22a. By moving the spool valve 17 of the housing 16 to a given position in the axial direction of the spool valve 17, which is, for example, any one of the positions illustrated in FIGS. 4 to 8, the ports are selectively opened and closed by the corresponding valve bodies 18a to 18e of the spool valve 17. This switches the operating mode of the oil control valve 10 to the corresponding one of the multiple operating modes, which are the lock mode, the oil filling mode, the phase-advancing mode, the maintaining mode, and the phase-retarding mode. By switching the operating modes in this manner, the oil supply/drainage mode for the variable valve timing mechanism 1 (FIG. 1) is changed. Such change of the oil supply/drainage mode for the variable valve timing mechanism 1 operates the movable member 3 of the variable valve timing mechanism 1 to change the rotational phase of the camshaft 2 relative to the crankshaft and operate the lock mechanism 22 of the variable valve timing mechanism 1.

Figure 9:
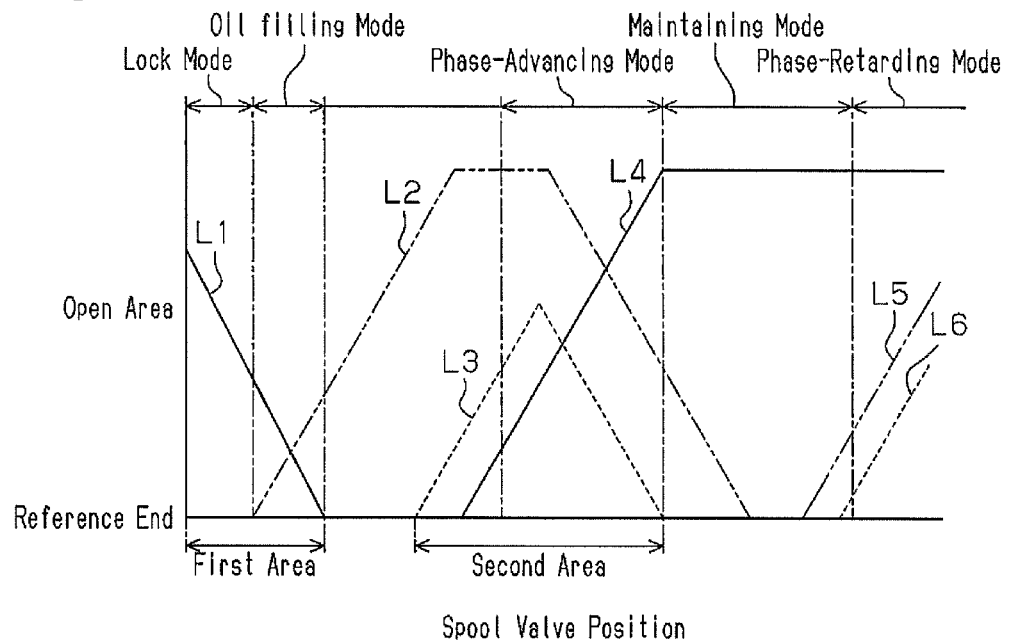
FIG. 9 is a graph representing changes in open areas of various types of oil lines in the oil control valve of FIG. 1 at the time of movement of the spool valve.

FIG. 9 is a graph representing changes in the open areas of the corresponding portions of the oil lines of the above-described hydraulic circuits in the oil control valve 10 at the time of movement of the spool valve 17 in the axial direction. Referring to FIG. 9, as the spool valve 17 becomes more spaced from the reference end (the position corresponding to the left end of the axis of abscissas of the graph), the operating mode of the oil control valve 10 changes sequentially from the lock mode to the oil filling mode, the phase-advancing mode, the maintaining mode, and the phase-retarding mode.

In the graph, the solid line L1 represents changes in the open area of the oil line for draining oil from the unlock chamber 22a of the lock mechanism 22. The long dashed double-short dashed lines L2 represent changes in the open area of the oil line for supplying oil to each phase-advancing hydraulic chamber 7 of the variable valve timing mechanism 1. The broken lines L3 represent changes in the open area of the oil line for draining oil from each phase-retarding hydraulic chamber 8 of the variable valve timing mechanism 1. The solid lines L4 represent changes in the open area of the oil line for supplying oil to the unlock chamber 22a of the lock mechanism 22. The long dashed double-short dashed line L5 represents changes in the open area of the oil line for supplying oil to each phase-retarding hydraulic chamber 8 of the variable valve timing mechanism 1. The broken line L6 represents changes in the open area of the oil line for draining oil from each phase-advancing hydraulic chamber 7 of the variable valve timing mechanism 1. That is, the valve bodies 18a to 18e of the spool valve 17 and the holes 16a to 16e and the recess 16f of the housing 16 are formed such that the open areas of the above-described oil lines change in correspondence with movement of the spool valve 17 in the manners represented by the graph.

In the first area represented by the solid line L1 in the entire movement range of the spool valve 17, the open area of the oil line for draining oil from the unlock chamber 22*a* of the lock mechanism 22 is greater than "0". In the first area, the port connected to the unlock chamber 22*a* is held in an open state to cause the lock mechanism 22 to perform the prohibiting operation by the drainage of oil. Specifically, in the first area, the oil drained from the unlock chamber 22*a* (the unlock oil line 23) passes through the oil control valve 10 in the manners represented in FIGS. 4 and 5.

In the second area represented by the broken lines L3 in the entire movement range of the spool valve 17 represented in FIG. 9, the open area of the oil line for draining oil from each phase-retarding hydraulic chamber 8 of the variable valve timing mechanism 1 is greater than 0. In the second area, the oil in the phase-retarding hydraulic chamber 8 is drained via the drainage passage 17a, which is formed in the spool valve 17. In the second area, the open area (represented by the long dashed double-short dashed lines L2) of the oil line for supplying the oil to each phase-advancing hydraulic chamber 7 of the variable valve timing mechanism 1 is greater than 0. In other words, in the second area, the oil is supplied to the phase-advancing hydraulic chamber 7. Specifically, in the second area, the oil drained from the phase-retarding hydraulic chamber 8 (the phase-retarding line 15) and the oil that should be supplied to the phase-advancing hydraulic chamber 7 (the phase-advancing line 14) pass through the oil control valve 10 in the manner represented in FIG. 6.

In the movement range of the spool valve 17 represented in FIG. 9, the aforementioned first and second areas are spaced from each other. More specifically, the second area is adjacent to the first area and located on the opposite side of the first area from the reference end (the left end of the axis of abscissas of FIG. 9) of the movement range with respect to the first area. That is, the first area is arranged between the reference end and the second area in the movement range. The first area and the second area are spaced apart at a predetermined distance. The valve bodies 18*a* to 18*e* of the spool valve 17 of the oil control valve 10 and the ports of the housing 16, which are illustrated in FIGS. 4 to 8, are formed such that the positions of the first area and the second area satisfy the above-described relationship. Particularly, since the shapes of the valve bodies 18*b* to 18*e*, the hole 16*b*, and the recess 16*f* greatly influence the positions of the first area and the second area, importance is placed on the formation of these.

Operation of the oil control valve 10 will hereafter be described.

Figure 6:
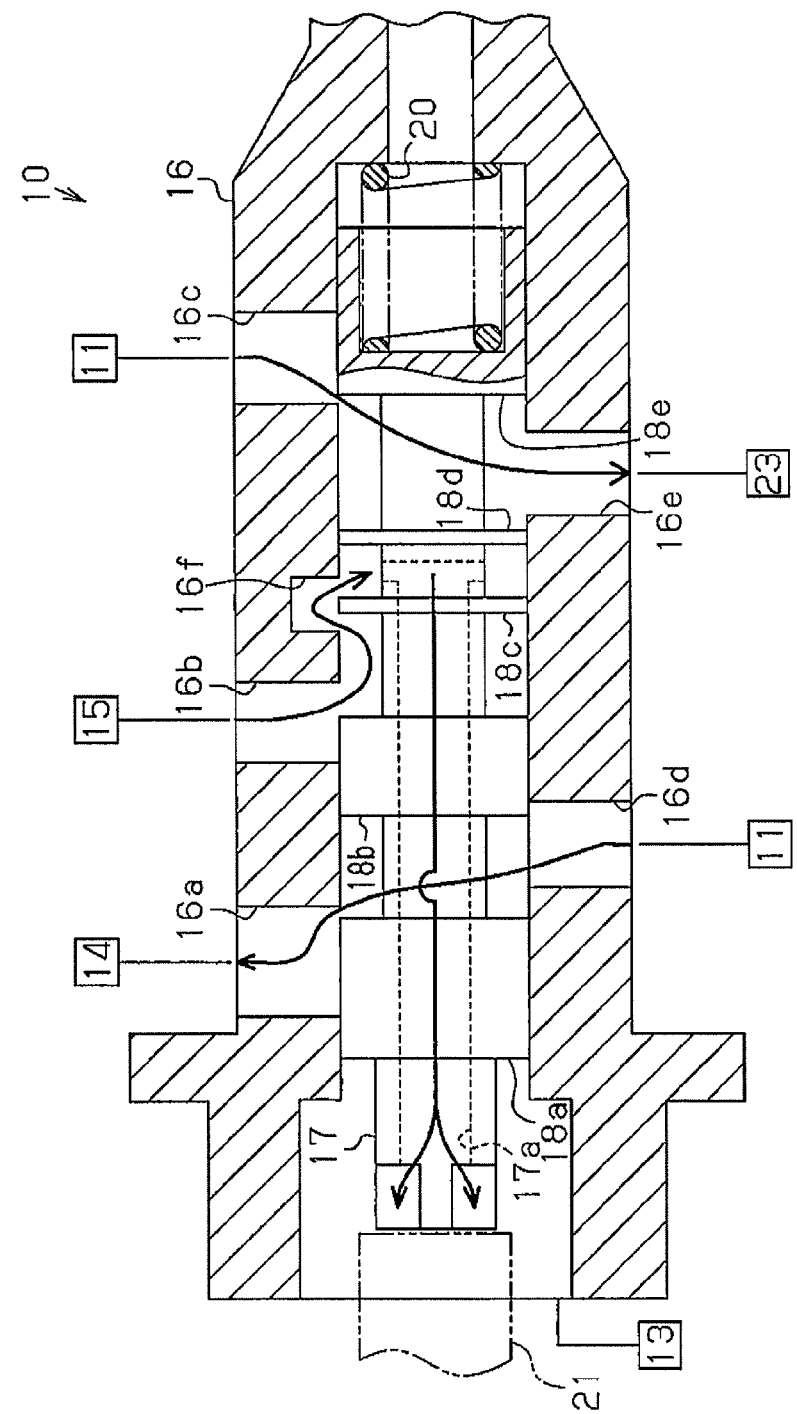
FIG. 6 is a cross-sectional view showing the interior of the oil control valve illustrated in FIG. 1 in a phase-advancing mode.
Figure 7:
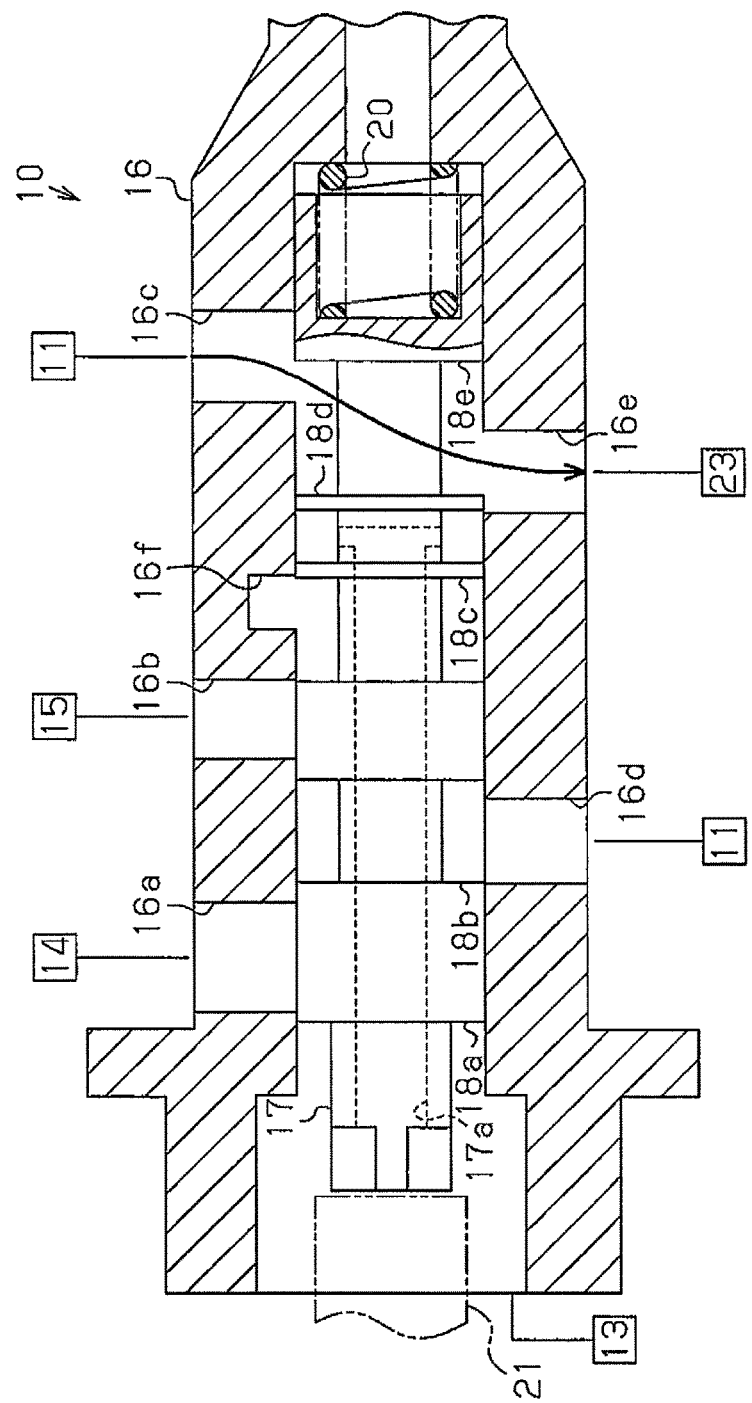
FIG. 7 is a cross-sectional view showing the interior of the oil control valve illustrated in FIG. 1 in a maintaining mode.
Figure 8:
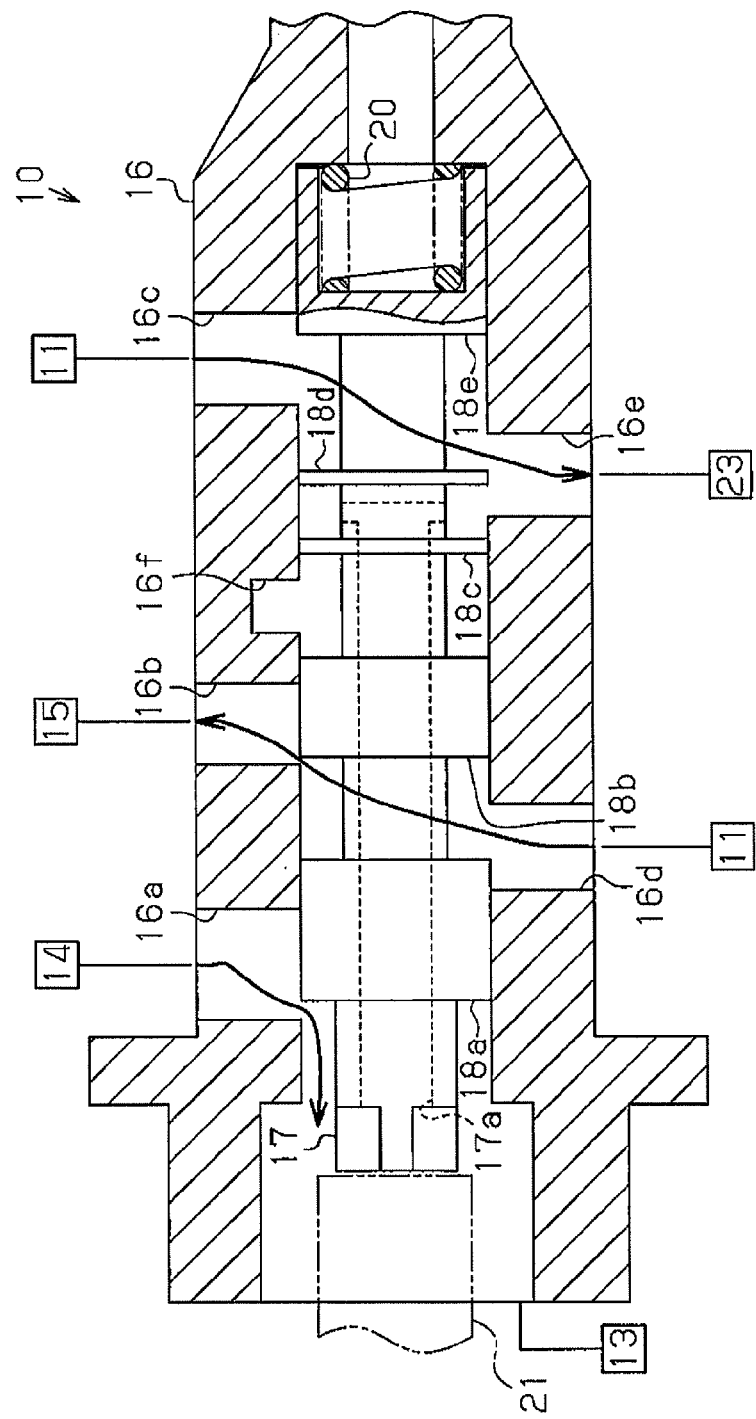
FIG. 8 is a cross-sectional view showing the interior of the oil control valve illustrated in FIG. 1 in a phase-retarding mode.
Figure 11:
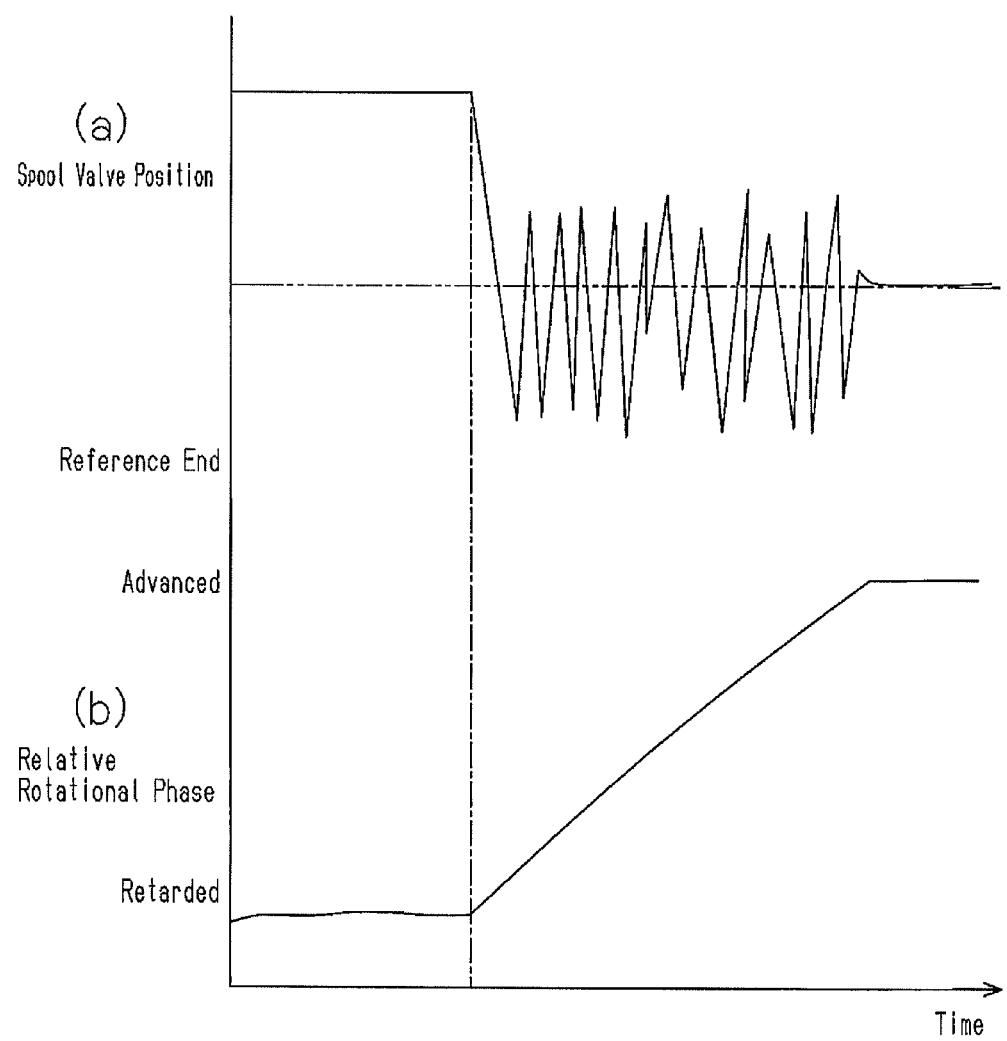
FIG. 11 is a timing chart, in which section (a) and section (b) represent changes in the position of the spool valve and changes in the rotational phase of a camshaft relative to a crankshaft over time, respectively.

To advance the rotational phase of the camshaft 2 relative to the crankshaft, as represented in FIG. 11(*b*), when the internal combustion engine is in operation, the operating mode of the oil control valve 10 is switched, for example, from the phase-retarding mode (FIG. 8) to the phase-advancing mode (FIG. 6). In this case, the position of the spool valve 17 may be adjusted to move the spool valve 17 toward the reference end such that the spool valve 17 is located in the second area. If the position of the spool valve 17 is adjusted in this manner, the oil drained from each phase-retarding hydraulic chamber 8 of the variable valve timing mechanism 1 is caused to flow in the drainage passage 17a, which is formed in the spool valve 17. Such flow of the oil in the drainage passage 17a applies force (hereinafter, fluid force) to the spool valve 17 in the axial direction of the spool valve 17. The fluid force is selectively increased and decreased through variation in the flow rate or flow amount of the oil flowing in the drainage passage 17a. Such increase/decrease of the fluid force and the urging force of the spring 20 acting on the spool valve 17 cause the spool valve 17 to resonate. As a result, the spool valve 17 vibrates greatly in the axial direction and thus moves in the manner represented in FIG. 1(*a*), for example. The long dashed double-short dashed line in FIG. 11(*a*) represents the position (the target position) to which the spool valve 17 must be moved.

Figure 10:
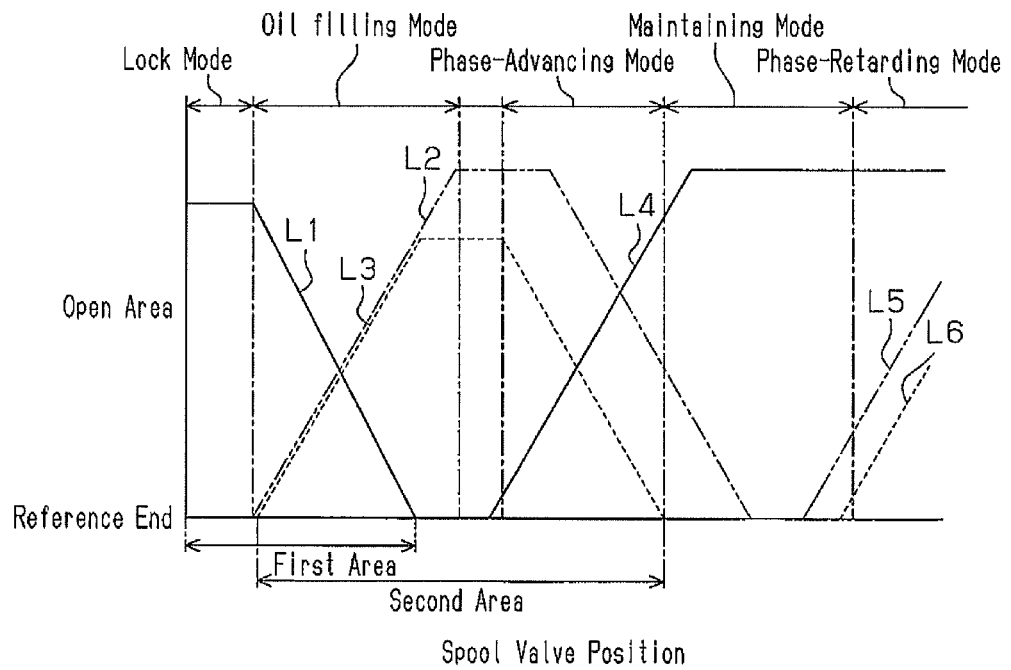
FIG. 10 is another graph representing changes in the open areas of the oil lines in the oil control valve of Fig. 1 at the time of movement of the spool valve.

Specifically, if a portion of the first area and a portion of the second area are overlapped with each other as illustrated in FIG. 10 when the spool valve 17 vibrates in the above-described manner, such vibration may move the spool valve 17 from the portion of the second area non-overlapped with the first area into the first area. If the spool valve 17 moves into the first area due to the above-described vibration, the oil may be drained from the unlock chamber 22*a* of the lock mechanism 22 and thus cause the lock mechanism 22 to execute unnecessary prohibiting operation. That is, if the pin 26 of the lock mechanism 22 is located at a position corresponding to the hole 25 as illustrated in FIGS. 2 and 3 when the spool valve 17 is moved into the first area due to the above-described vibration, unnecessary movement of the pin 26 into the hole 25 (unnecessary prohibiting operation) occurs. Such unnecessary prohibiting operation hampers proper operation of the movable member 3 in the variable valve timing mechanism 1.

To solve this problem, in the oil control valve 10 of the illustrated embodiment, referring to FIG. 9, the second area is adjacent to the first area and located on the opposite side of the first area from the reference end (the left end of the axis of abscissas of the graph) of the movement range of the spool valve 17. That is, the first area is arranged between the reference end and the second area in the movement range. Also, the first area and the second area are spaced apart at the predetermined distance. Therefore, even if the spool valve 17 vibrates and moves from a position in the second area toward the first area as has been described, the spool valve 17 does not enter the first area. This restrains unnecessary prohibiting operation by the lock mechanism 22 caused by the spool valve 17 entering the first area and thus draining the oil from the unlock chamber 22*a* of the lock mechanism 22. As a result, hampering of proper operation of the variable valve timing mechanism 1 by such unnecessary prohibiting operation is also restrained.

Figure 12:
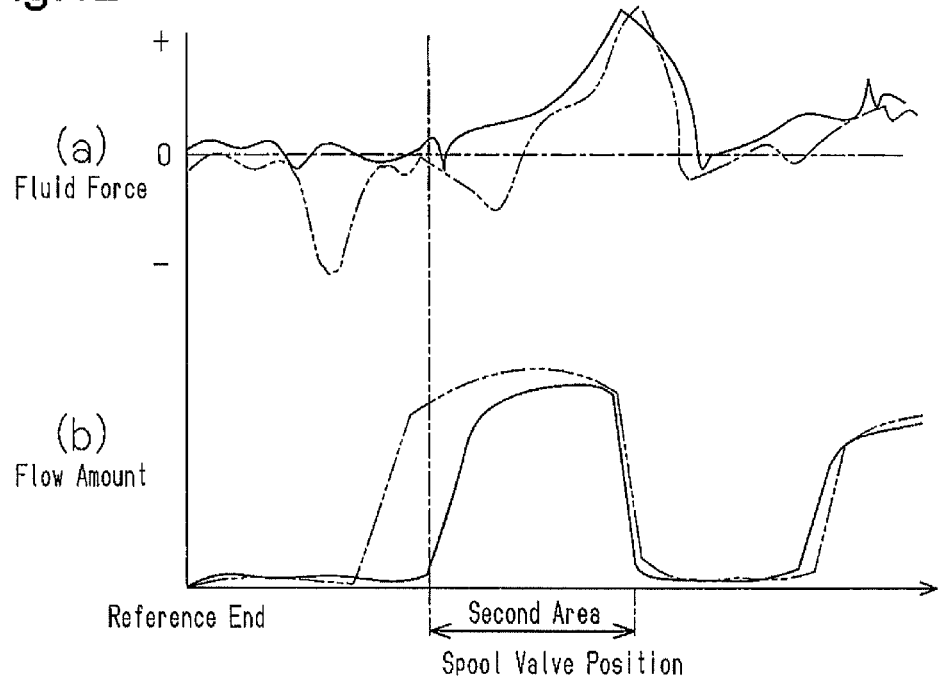
FIG. 12 is a graph, in which section (a) and section (b) represent changes in the intensity of the fluid force acting on the spool valve and changes in the flow amount of oil drained via a drainage passage at the time of movement of the spool valve, respectively.

In FIG. 12, section (a) represents changes in the intensity of the fluid force acting on the spool valve 17 in correspondence with movement of the spool valve 17. Section (b) represents changes in the flow amount of the oil drained via the drainage passage 17a in correspondence with the movement of the spool valve 17. In the graph, the solid lines correspond to the oil control valve 10 of the illustrated embodiment, which has the characteristics of changes in the open areas represented in FIG. 9 with respect to the movement of the spool valve 17. The long dashed double-short dashed lines correspond to the oil control valve having the characteristics of changes in the open areas represented in FIG. 10 with respect to the movement of the spool valve.

In the oil control valve 10 of the illustrated embodiment, the flow amount of the oil drained via the drainage passage 17a increases in the second area, as represented by the solid line in FIG. 12(*b*). In contrast, the oil control valve having the characteristics of changes in the open areas represented in FIG. 10 has a second area enlarged toward the reference end (the left end of the axis of abscissas of the graph), compared to the oil control valve 10 of the illustrated embodiment. Correspondingly, as represented by the long dashed double-short dashed line, the area in which the flow amount of the oil drained via the drainage passage increases is also enlarged toward the reference end, compared to the second area represented by the solid line.

Therefore, in the oil control valve having the characteristics of changes in the open areas represented in FIG. 10, increase in the fluid force acting on the spool valve (in this example, increase in the negative direction) occurs at a position close to the reference end as represented by the long dashed double-short dashed line in FIG. 12(*a*), unlike in the case of the oil control valve 10 of the illustrated embodiment (represented by the solid line). As a result, when the oil control valve having the characteristics of changes in the open area illustrated in FIG. 10 vibrates due to the fluid force acting on the spool valve, such vibration may move the spool valve from the second area into the first area. This causes the lock mechanism 22 to perform unnecessary prohibiting operation, which hampers proper operation of the variable valve timing mechanism 1. This problem is restrained by the oil control valve 10 of the illustrated embodiment.

Figure 13:
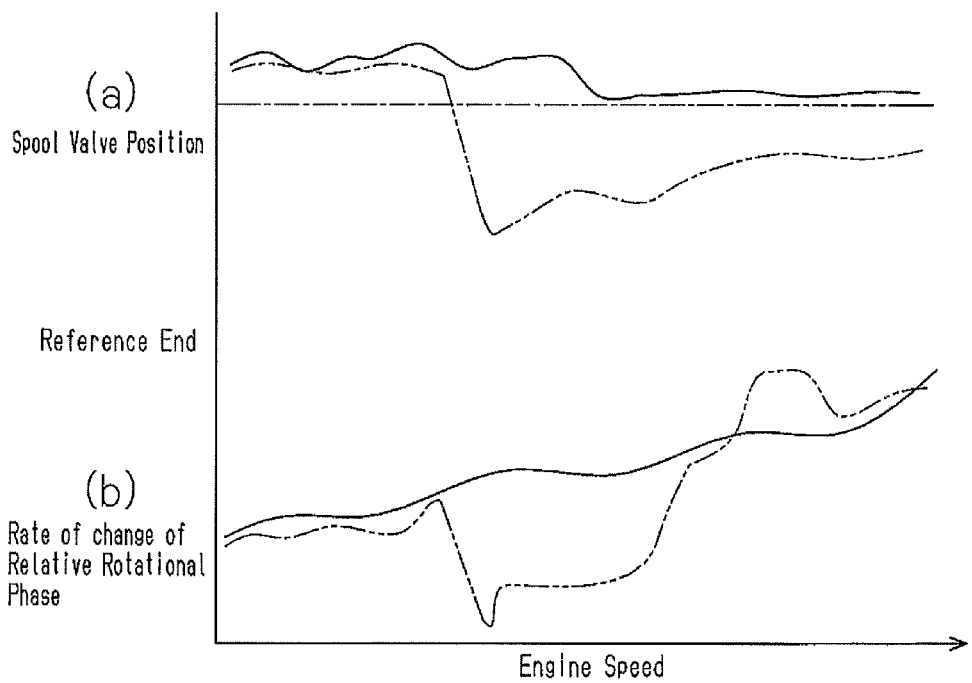
FIG. 13 is a graph, in which section (a) and section (b) represent movement of the spool valve at the time of vibration of the spool valve in a second area and the changing speed of the rotational phase of the camshaft relative to the crankshaft at the time of the vibration for values of the engine speed, respectively.

In FIG. 13, section (a) represents movement of the spool valve 17 at the time of the aforementioned vibration of the spool valve 17 in the second area for values of the engine speed. Section (b) represents the rate of change of the rotational phase of the camshaft 2 relative to the crankshaft (the operating speed of the variable valve timing mechanism 1) at the time of the vibration for the respective values of the engine speed. In the graph, the solid lines correspond to the oil control valve 10 of the illustrated embodiment, which has the characteristics of changes in the open areas represented in FIG. 9 with respect to the movement of the spool valve 17. The long dashed double-short dashed lines correspond to the oil control valve having the characteristics of changes in the open areas represented in FIG. 10 with respect to the movement of the spool valve.

As is clear from FIG. 13(*a*), the oil control valve having the characteristics of changes in the open areas represented in FIG. 10 exhibits increased movement toward the reference end at the time of the aforementioned vibration of the spool valve, compared to the oil control valve 10 of the illustrated embodiment. Specifically, if, as represented by the long dashed double-short dashed line in FIG. 13(*a*), the spool valve moves toward the reference end with respect to the long dashed short dashed line in the graph, the spool valve enters the first area and causes the lock mechanism 22 to perform unnecessary prohibiting operation. As represented by the long dashed double-short dashed line in FIG. 13(*b*), such unnecessary prohibiting operation by the lock mechanism 22 decreases the rate of change of the rotational phase of the camshaft 2 relative to the crankshaft, which is the response speed of the movable member 3, compared to the case represented by solid line (the case of the oil control valve 10 of the illustrated embodiment).

This is related to the fact that, when the aforementioned unnecessary prohibiting operation is carried out by the lock mechanism 22, that is, when oil is drained from the unlock chamber 22*a* such that the urging force of the spring 24 causes the pin 26 to enter the hole 25, such movement of the pin 26 causes communication between the corresponding phase-advancing hydraulic chamber 7 and the associated phase-retarding hydraulic chamber 8 of the variable valve timing mechanism 1 via the communication line 27 of the lock mechanism 22. If the pin 26 enters the hole 25 as illustrated in FIG. 3, for example, due to the unnecessary prohibiting operation performed by the lock mechanism 22, the phase-advancing hydraulic chamber 7 is caused to communicate with the phase-retarding hydraulic chamber 8 via the communication line 27. This hampers proper operation of the movable member 3, which is brought about based on the oil supply/drainage for the phase-advancing and phase-retarding hydraulic chambers 7, 8. More specifically, the response speed by which the movable member 3 is operated based on the oil supply/drainage for the phase-advancing hydraulic chamber 7 and the phase-retarding hydraulic chamber 8 is decreased. However, this problem is restrained by the oil control valve 10 of the illustrated embodiment.

The above illustrated embodiment achieves the following advantages.

(1) The valve bodies 18*a* to 18*e* of the spool valve 17 of the oil control valve 10 and the aforementioned ports of the housing 16 are formed such that the first area and the second area are spaced from each other in the movement range of the spool valve 17. Therefore, even if the spool valve 17 vibrates in the second area and thus moves from a position in the second area toward the first area, the spool valve 17 is unlikely to enter the first area. This restrains unnecessary prohibiting operation by the lock mechanism 22 caused by the spool valve 17 entering the first area and thus draining the oil from the unlock chamber 22*a* of the lock mechanism 22. Further, hampering of proper operation of the variable valve timing mechanism 1 by the unnecessary prohibiting operation is restrained.

(2) The spool valve 17 is urged by the spring 20 toward the reference end of the movement range. In the movement range, the second area is located adjacent to the first area and located on the opposite of the first area from the reference end of the movement range of the spool valve 17. That is, the first area is arranged between the reference end and the second area in the movement range. Also, the first area and the second area are spaced apart by the predetermined distance. If the position of the spool valve 17 is adjusted such that the spool valve 17 is located in the second area, the fluid force acting on the spool valve 17 is selectively increased and decreased through variation in the flow rate and flow amount of the oil drained from the variable valve timing mechanism 1 via the drainage passage 17*a*. Such increase/decrease in the fluid force and the urging force of the spring 24 acting on the spool valve 17 cause the spool valve 17 to resonate. This vibrates the spool valve 17 greatly in the axial direction. However, the aforementioned relationship between the positions of the second and first areas makes it unlikely for the spool valve 17 to enter the first area when the spool valve 17 vibrates.

(3) When unnecessary prohibiting operation by the lock mechanism 22 is caused by the aforementioned vibration of the spool valve 17, that is, when the oil is drained from the unlock chamber 22*a* such that the urging force of the spring 24 causes the pin 26 to enter the hole 25, such movement of the pin 26 causes communication between the corresponding phase-advancing hydraulic chamber 7 and the associated phase-retarding hydraulic chamber 8 of the variable valve timing mechanism 1 via the communication line 27 of the lock mechanism 22. When the phase-advancing hydraulic chamber 7 communicates with the phase-retarding hydraulic chamber 8 via the communication line 27, proper operation of the movable member 3, which is brought about based on the oil supply/drainage for the phase-advancing and phase-retarding hydraulic chambers 7, 8, is hampered. More specifically, the response speed by which the movable member 3 is operated based on the oil supply/drainage for the phase-advancing hydraulic chamber 7 and the phase-retarding hydraulic chamber 8 is decreased. However, movement of the spool valve 17 from the second area into the first area caused by the vibration of the spool valve 17 is restrained. This restrains the above-described problem that the proper operation of the movable member is hampered, or, more specifically, the problem that the response speed by which the movable member 3 is operated is decreased.

The illustrated embodiment may be modified to, for example, the forms described below.

The oil control valve 10 does not necessarily have to function as a bolt for fixing the movable member 3 of the variable valve timing mechanism 1 to the camshaft 2. An oil control valve 10 without such a function can be arranged at a position other than in the camshaft 2.

The oil control valve 10 operating in the oil filling mode may supply oil to each phase-retarding hydraulic chamber 8 instead of each phase-advancing hydraulic chamber 7. In this case, the oil supplied to the phase-retarding hydraulic chamber 8 flows into the phase-advancing hydraulic chamber 7 via the communication line 27 of the lock mechanism 22. In this manner, the variable valve timing mechanism 1 is rapidly filled with the oil.

The lock mechanism 22 does not necessarily have to include the communication line 27. The communication line 27 may thus be omitted.

The lock mechanism 22 may fix the rotational position of the movable member 3 relative to the case 4 at a position other than the middle position in the relative rotation range of the movable member 3, which is, for example, a maximally retarded position or a maximally advanced position.

The spring 20 may be omitted and the spool valve 17 may be fixed to the actuator 21, and the spool valve 17 may be moved solely by the actuator 21. In this case, the relationship between the positions of the first area and the second area with respect to the reference end of the movement range of the spool valve 17 may be reversed from that in the above illustrated embodiment.

The drainage passage 17a is illustrated as an example of the passage formed in the spool valve 17. However, the passage formed in the spool valve 17 may be a passage through which oil is supplied to the variable valve timing mechanism 1 and the lock mechanism 22 or a passage through which oil is both supplied to and drained from the variable valve timing mechanism 1 and the lock mechanism 22. In this case, the second area is a movement area of the spool valve 17 that ensures such an operating mode of the oil control valve 10 that oil passes through the aforementioned passage.

The variable valve timing mechanism 1 may vary the valve timing of exhaust valves, or, in other words, the rotational phase of the exhaust camshaft relative to the crankshaft.

The invention claimed is:

1. An oil control valve comprising a spool valve that is arranged in a housing and movable in an axial direction of the oil control valve, wherein a plurality of ports connected to a variable valve timing mechanism and a lock mechanism are formed in the housing, the oil control valve is adapted to perform:

supply/drainage of oil to and from the variable valve timing mechanism to hydraulically operate the variable valve timing mechanism by adjusting a position of the spool valve in the axial direction to selectively open and close the ports with a valve body of the spool valve; and supply/drainage of oil to and from the lock mechanism to carry out a prohibiting operation for prohibiting the operation of the variable valve timing mechanism and a permitting operation for permitting the operation of the variable valve timing mechanism, the variable valve timing mechanism has a movable member that divides an interior of a case into a phase-advancing hydraulic chamber and a phase-retarding hydraulic chamber, the variable valve timing mechanism is adapted to operate the movable member by supplying oil to one of the phase-advancing and phase-retarding hydraulic chambers and draining oil from the other one of the phase-advancing and phase-retarding hydraulic chambers, thereby changing a rotational phase of a camshaft relative to a crankshaft, a passage in which the oil flows is formed in the spool valve, and the valve body of the spool valve and the ports of the housing are formed such that:

a movement range of the spool valve includes a first range, in which the spool valve opens those of the ports connected to the lock mechanism to perform the prohibiting operation by draining oil from the lock mechanism, and a second range in which the spool valve performs the supply/drainage of oil to and from the variable valve timing mechanism through the passage;

in the second range, the oil is supplied to the phase-advancing hydraulic chamber, and the oil in the phase-retarding hydraulic chamber is drained;

the first range is spaced from the second range in the movement range, the first range and the second range are spaced apart at a predetermined interval; and in the predetermined interval, the oil is supplied to the phase-advancing hydraulic chamber, and the oil in the phase-retarding hydraulic chamber is not drained.

2. The oil control valve according to claim 1, wherein the spool valve is urged by a spring toward a reference end of the movement range of the spool valve, the first range, is arranged between the reference end and the second range in the movement range, and in the second range, the oil drained from the variable valve timing mechanism flows in the passage formed in the spool valve.

3. The oil control valve according to claim 2, wherein the lock mechanism selectively inserts and retracts a pin arranged in the movable member with respect to a hole formed in the case using force produced by hydraulic pressure and urging force of a spring, the lock mechanism is adapted to perform the prohibiting operation, in which the pin is inserted into the hole using the urging force by draining the oil and thus decreasing the force produced by the hydraulic pressure, the lock mechanism is adapted to perform the permitting operation, in which the pin is retracted from the hole against the urging force by receiving the supply of oil and thus increasing the force produced by the hydraulic pressure, the lock mechanism includes a communication line that causes communication between the phase-advancing hydraulic chamber and the phase-retarding hydraulic chamber when the prohibiting operation is performed, and in the second range, oil is supplied to the phase-advancing hydraulic chamber and oil is drained from the phase-retarding hydraulic chamber of the variable valve timing mechanism such that the oil flows in the passage formed in the spool valve.

* * * * *